United States Patent
Pignataro et al.

(10) Patent No.: US 10,693,777 B2
(45) Date of Patent: Jun. 23, 2020

(54) IN-SITU OPERATIONS, ADMINISTRATION, AND MAINTENANCE (IOAM) FOR SOFTWARE DEFINED ARCHITECTURES (SDAS)

(71) Applicant: Cisco Technology, Inc., San Jose, CA (US)

(72) Inventors: Carlos M. Pignataro, Raleigh, NC (US); Nagendra Kumar Nainar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 95 days.

(21) Appl. No.: 16/018,662

(22) Filed: Jun. 26, 2018

(65) Prior Publication Data

US 2019/0394124 A1 Dec. 26, 2019

(51) Int. Cl.
| | | |
|---|---|---|
| H04L 12/721 | (2013.01) | |
| H04L 29/06 | (2006.01) | |
| H04L 29/08 | (2006.01) | |

(52) U.S. Cl.
CPC .............. H04L 45/70 (2013.01); H04L 69/22 (2013.01); *H04L 67/10* (2013.01)

(58) Field of Classification Search
CPC .......... H04L 45/70; H04L 69/22; H04L 67/10
See application file for complete search history.

(56) References Cited

U.S. PATENT DOCUMENTS

| 7,433,301 B2 | 10/2008 | Akahane et al. | |
| 2009/0037713 A1* | 2/2009 | Khalid | H04L 12/4633 713/1 |
| 2014/0198791 A1 | 7/2014 | Lim | |
| 2016/0182344 A1* | 6/2016 | Subhedar | H04L 1/24 370/241.1 |
| 2016/0261474 A1* | 9/2016 | Raghavan | H04L 43/10 |

(Continued)

FOREIGN PATENT DOCUMENTS

WO WO-2016135726 A1 9/2016

OTHER PUBLICATIONS

Brockners, et al., "Data Fields for In-situ OAM", ippm—Internet-Draft, <draft-brockners-inband-oam-data-04>, Mar. 29, 2017, 26 pages, IETF Trust.

(Continued)

*Primary Examiner* — Curtis A Alia

(74) *Attorney, Agent, or Firm* — Behmke Innovation Group LLC; James M. Behmke; Jonathon P. Western

(57) ABSTRACT

In one embodiment, a router receives a packet from a network device in a software defined architecture (SDA) network, and obtains iOAM data from an outer header of the packet, the iOAM data inserted into the outer header by one or more network devices that previously processed the packet. The router then copies the iOAM data into a locally pertinent header, and after determining local iOAM data of the router, appends the local iOAM data to the iOAM data copied into the locally pertinent header. The router may then process the packet accordingly. In another embodiment, an SDA router may insert an indication of one or more applied policies into an iOAM header of the packet, such that an edge router can determine any unapplied policies and subsequently apply them.

20 Claims, 9 Drawing Sheets

(56) References Cited

U.S. PATENT DOCUMENTS

2016/0315850 A1    10/2016  Dara et al.
2016/0315921 A1*   10/2016  Dara ..................... H04L 69/22

OTHER PUBLICATIONS

Brockners, et al., "Next-Gen Network Telemetry: iOAM—In-band measurement for IPv6", http://pirl.tech/pdf/Frank_Brockners_iOAM6_Paris_8March2016.pdf, 30 pages, Mar. 8, 2016, Cisco.
Brockners, et al., "Proof of Transit", Network Working Group, Internet-Draft, <draft-brockners-proof-of-transit-00>, Jul. 8, 2016, 20 pages, IETF Trust.

* cited by examiner

IN-SITU OPERATIONS, ADMINISTRATION, AND MAINTENANCE (IOAM) FOR SOFTWARE DEFINED ARCHITECTURES (SDAS)

TECHNICAL FIELD

The present disclosure relates generally to computer networks, and, more particularly, to in-situ Operations, Administration, and Maintenance (iOAM) for Software Defined Architectures (SDAs).

BACKGROUND

Devices (e.g., sensors) within an Internet of Things (IoT) network, e.g., running "RPL" (IPv6 Routing Protocol for Low Power and Lossy Networks) can communicate among themselves (source and destination sensors within the same RPL instances) or across domains (sensors within different RPL instances) or even outside the domain.

In such cases, the following challenges presented:
End-to-end path and network telemetry data collection—
  How can operators collect the path and other telemetry data within a RPL environment (Intra- and Inter-RPL instances)?
Distributed policy application—How can policy application be distributed to routers, and how can it be ensured that the policies are applied?

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
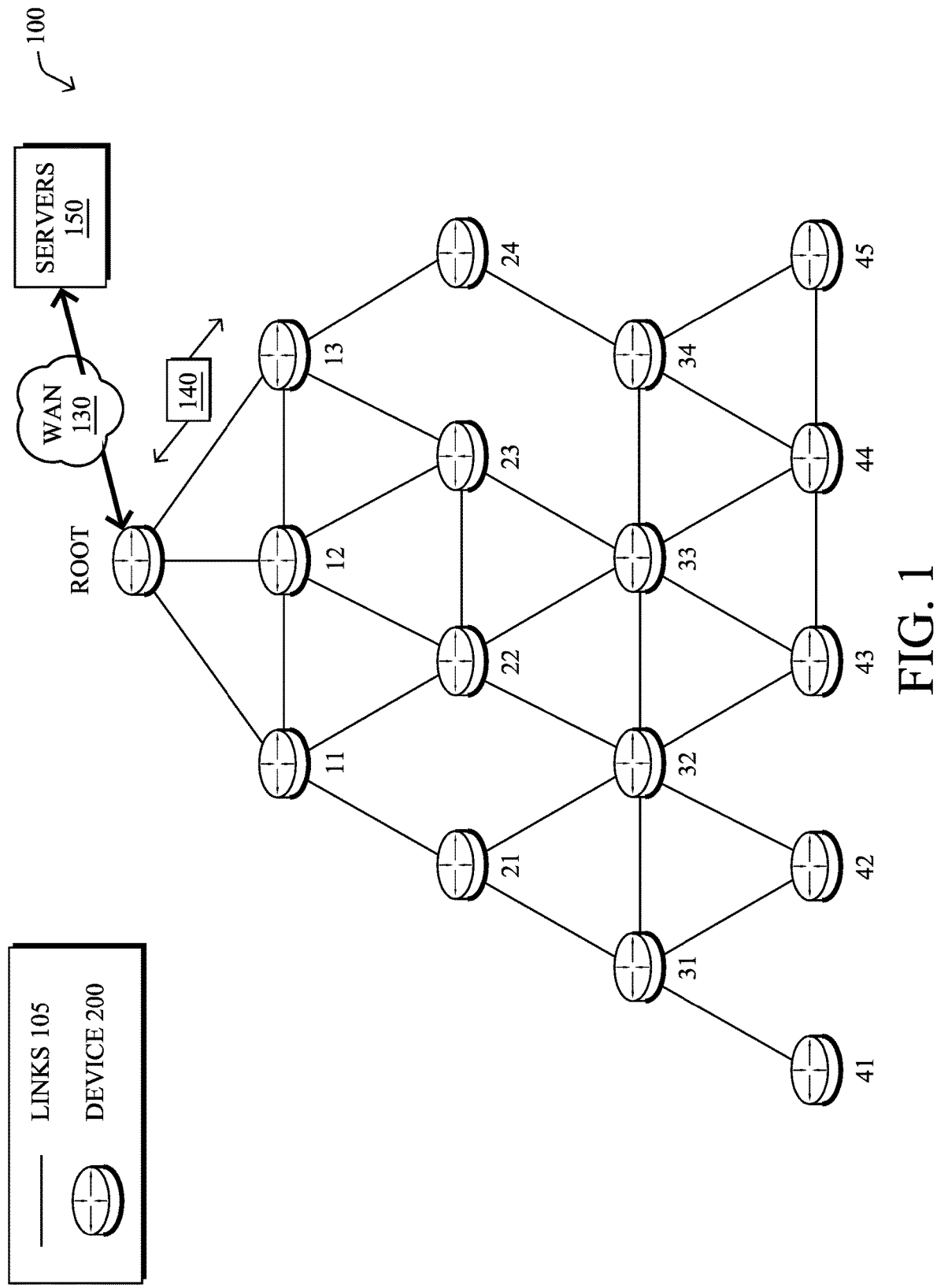
FIG. 1 illustrates an example communication network.

According to one or more embodiments of the disclosure, a router receives a packet from a network device in a software defined architecture (SDA) network, and obtains in-situ operations, administration, and management (iOAM) data from an outer header of the packet, the iOAM data inserted into the outer header by one or more network devices that previously processed the packet. The router then copies the iOAM data into a locally pertinent header, and after determining local iOAM data of the router, appends the local iOAM data to the iOAM data copied into the locally pertinent header. The router may then process the packet accordingly.

According to one or more additional embodiments of the disclosure, a software defined architecture (SDA) network router receives a packet from an SDA network node, and determines which particular policies should be applied to the packet. The router may then determine an ability of the SDA network router to apply the particular policies to the packet, and then applies a subset of the particular policies according to the ability of the SDA network router to apply the particular policies to the packet. After inserting an indication of the subset of applied policies into an iOAM header of the packet, the SDA network router may then forward the packet toward an edge router to cause the edge router to apply one or more unapplied policies according to the subset of applied policies.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links

105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative root node, such as a field area router (FAR), may interconnect the local networks with a WAN 130 (e.g., through a "fog node" at the edge of the network), which may enable communication with other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
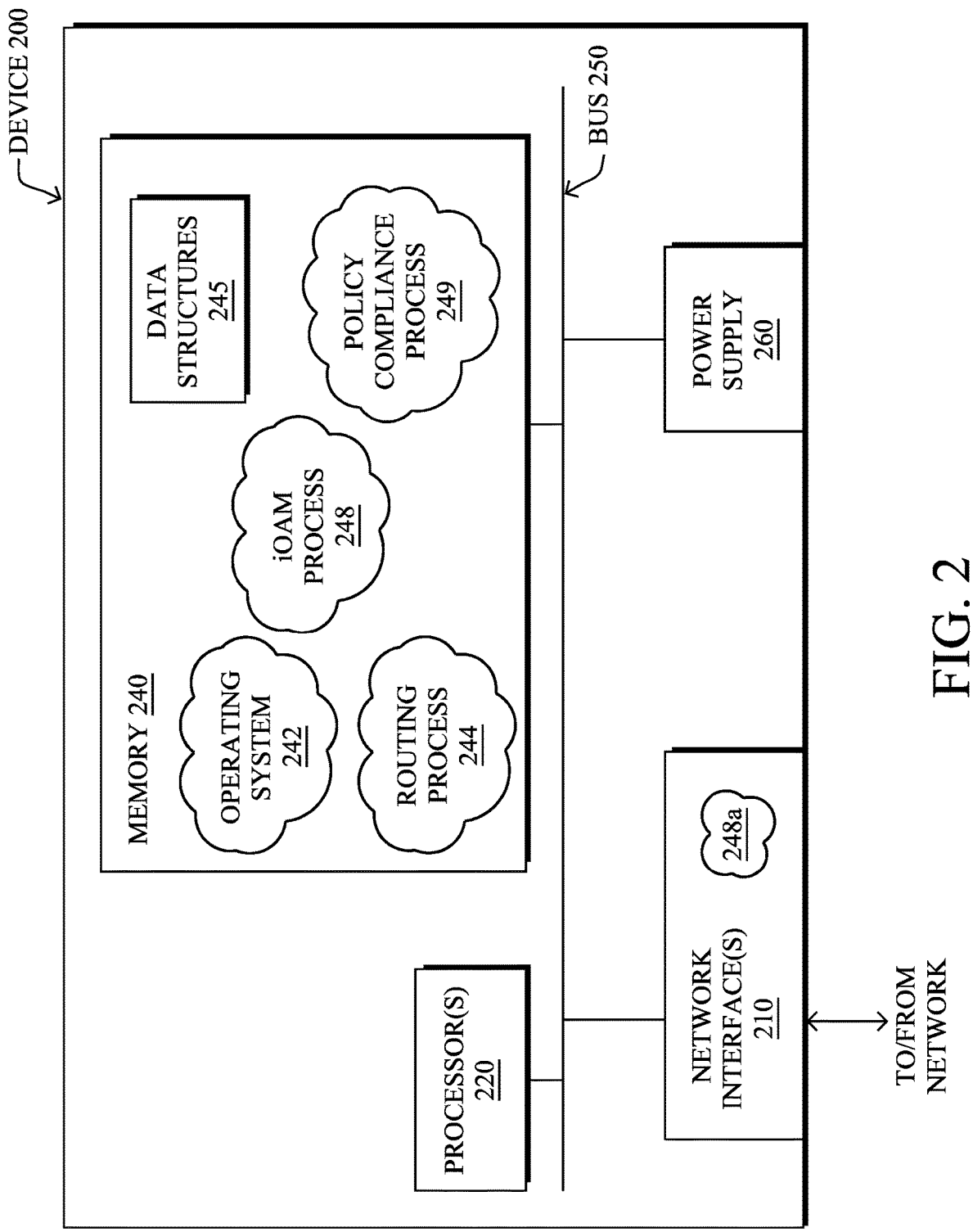
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative "iOAM" process 248 and optionally a policy compliance process 249, each as described herein. Note that while process 248, in particular, is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
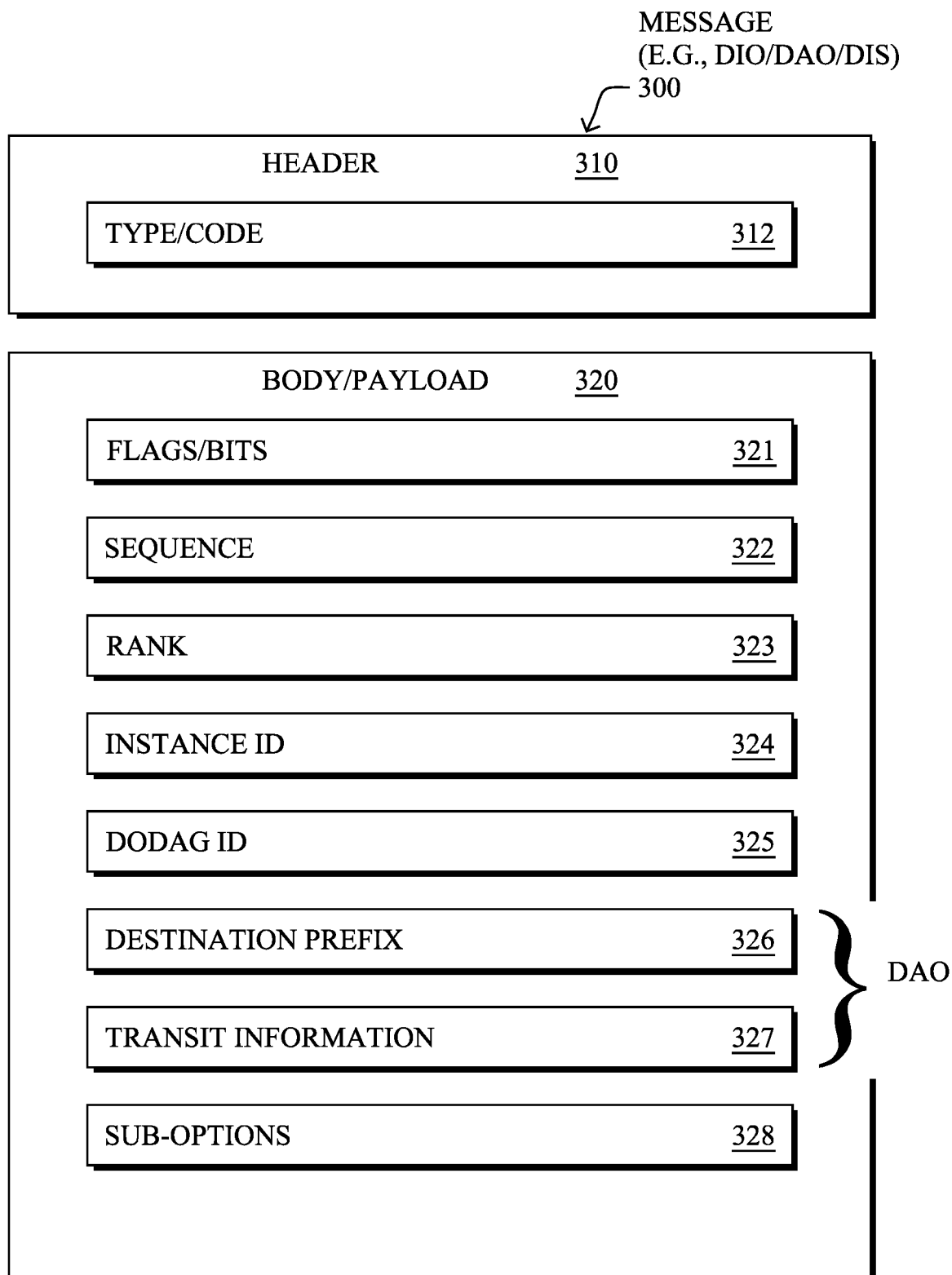
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
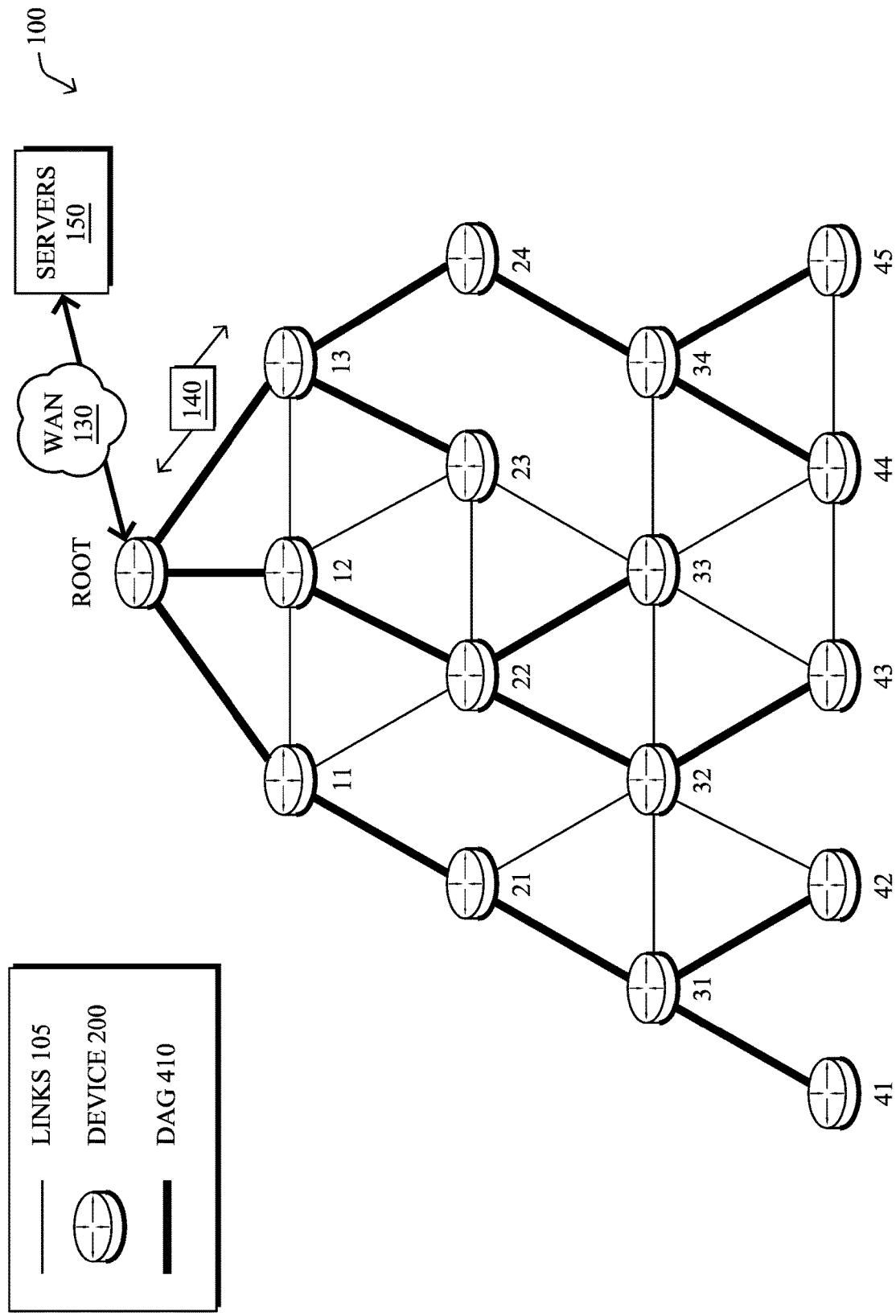
FIG. 4 illustrates an example directed acyclic graph (DAG) in the network.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

——iOAM for SDAs——

As noted above, devices within an IoT network (e.g., running RPL) can communicate among themselves (source and destination sensors within the same RPL instances) or across domains (sensors within different RPL instances) or even outside the domain.

Generally, a RPL network is composed of a 6LBR (6LoWPAN Border Router, e.g., a "root" node), 6BBR (6LoWPAN Backbone Router, e.g., a "fog" node), one or more 6LRs (6LoWPAN Routers), and one or more 6LNs (6LoWPAN Nodes, e.g., "leaf" or "host" nodes), logically organized in a DODAG structure (Destination Oriented Directed Acyclic Graph). Notably, "6LoWPAN" (IPv6 over Low-Power Wireless Personal Area Networks) is an example networking technology or adaptation layer used by many LLNs that allows IPv6 packets to be carried efficiently within small link layer frames, such as those defined by IEEE 802.15.4. 6LoWPAN, however, is not meant to be limiting to the scope of the embodiments herein, and is merely an example that is well understood by those skilled in the art.

Figure 5:
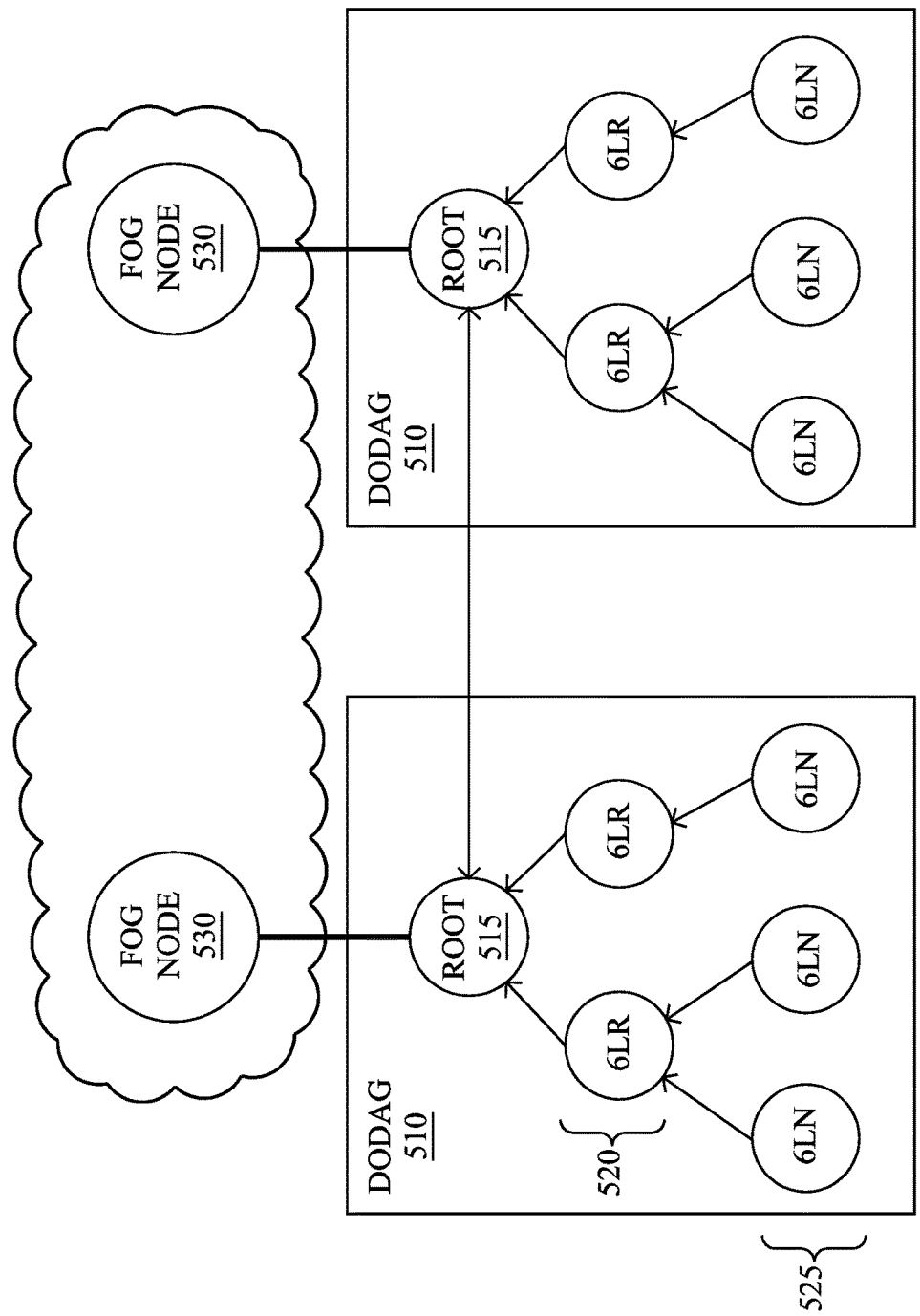
FIG. 5 illustrates an example of a typical RPL environment.

FIG. 5 illustrates a simplified example of a typical RPL arrangement. In particular, in environment 500, two DODAGs 510, each consisting of a corresponding root node 515 (e.g., 6LBR), one or more devices configured as routers 520 (e.g., 6LRs), and one or more devices configured as leaf nodes 525 (e.g., 6LNs), may communicate with each other through the root nodes (if connected), or else through one or more fog nodes 530 (e.g., 6BBRs) or a WAN in certain configurations.

As also noted above, in such cases, two particular challenges are presented by RPL environments. First, end-to-end path and network telemetry data can be difficult to collect. The techniques described herein, however, allow operators to collect the path and other telemetry data within RPL environments (Intra- and Inter-RPL instances), which notably will help with multiple purposes including service level agreement (SLA) assurance. Second, regarding distributed policy application, the techniques described herein provide a simple way to distribute the policy application to 6LRs and to ensure that the policies are applied. For instance, if a 6LR is overloaded, it can ignore certain policies (e.g., for inter-domain traffic) that can be detected and applied by a root or fog node.

In particular, the present disclosure newly defines the use of in-situ operations, administration, and management (iOAM) techniques for these purposes, i.e., defining how iOAM can be used to collect the IoT network data from 6LN, 6LR, 6LBR, etc., which can be used to solve the above mentioned challenges. For example, in addition to collecting path and telemetry data, the techniques herein can also be used to carry newly defined "Proof of Policy Application" information that can be used by fog/root nodes to apply relevant policies if required.

Specifically, according to one or more embodiments of the disclosure as described in detail below, a router (e.g., root/fog router) receives a packet from a network device in a software defined architecture (SDA) network, and obtains iOAM data from an outer header of the packet, the iOAM data inserted into the outer header by one or more network devices that previously processed the packet (e.g., within a RPL network). The router then copies the iOAM data into a locally pertinent header, and after determining local iOAM data of the router, appends the local iOAM data to the iOAM data copied into the locally pertinent header. The router may then process the packet accordingly. Furthermore, according to one or more additional embodiments of the disclosure as described in detail below, an SDA network router (e.g., 6LR) receives a packet from an SDA network node, and determines which particular policies should be applied to the packet. The router may then determine an ability of the SDA network router to apply the particular policies to the packet, and then applies a subset of the particular policies according to the ability of the SDA network router to apply the particular policies to the packet. After inserting an indication of the subset of applied policies (or an indication of the unapplied policies) into an iOAM header of the packet, the SDA network router may then forward the packet toward an edge router to cause the edge router to apply one or more unapplied policies according to the subset of applied policies (e.g., perform "proof of policy" verification and if any policies were not applied, it can apply the same before forwarding the packet).

Illustratively, the techniques described herein may be performed by hardware, software, and/or firmware, such as in accordance with the iOAM process 248, which may include computer executable instructions executed by the processor 220 (or independent processor of interfaces 210) to perform functions relating to the techniques described herein, e.g., in conjunction with policy compliance process 249 in certain embodiments.

In general, in-situ, operations, administration, and management (iOAM) allows for the collection of various flow characteristics (e.g., the complete path taken, real-time telemetry of individual data packets and flows, etc.) by piggy-backing (embedding) the data collection in the packet headers themselves of actual user traffic (e.g., packets originated and terminated at the application layer). This is in contrast to out-of-band approaches that may gather characteristics by introducing new packets into the network, such as probe packets, and is a complementary approach.

Figure 6:
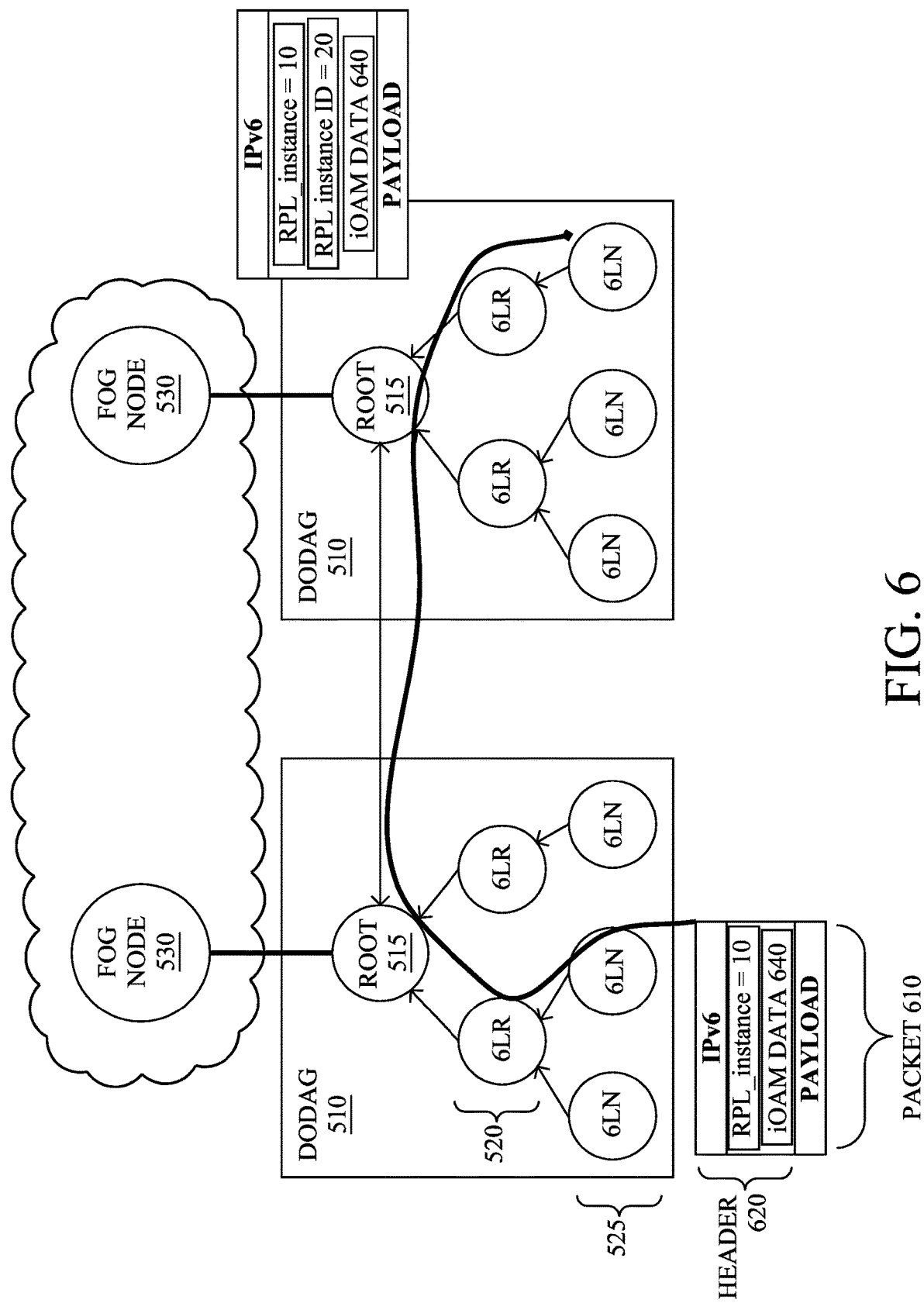
FIG. 6 illustrates an example of iOAM for SDAs.

Operationally, according to one or more particular embodiments herein, end-to-end network path collection can be enabled through iOAM in SDAs (e.g., RPL instances) as follows, with reference generally to FIG. 6. In particular, any 6LR upon receiving a packet 610 from a 6LN, is expected to push RPL instance ID (e.g., RPL Instance ID 10) into the header 620 of the packet, such as an IPv6 header as shown, or else encapsulating the packet within an IPv6-in-IPv6 tunnel with segment routing header (SRH), depending upon configuration. In either case, the 6LR will also include additional in-situ OAM data 640 in the header, and adds relevant data to it, such as (but not limited to), RPL Instance ID, time received, timeslot info, channel info, and so on.

The packet 610 traverses along the DODAG, collecting data at the routers. Whenever the packet is traversing across the DODAG boundary to another DODAG, the incoming DODAG root node copies the in-situ OAM data from the previous DODAG header to the new DODAG header, and also appends the new header further with the new RPL instance (e.g., RPL Instance ID 20) and other local information. Conversely, whenever the packet is leaving the DODAG, the fog node copies the in-situ OAM data from an outer header to an inner header, while also appending the inner header further with additional fog router related information. Said differently, the egress root node (e.g., of RPL Instance 10), upon receiving the packet, may decapsulate the packet, and either forwards it out to an external network (e.g., the fog/WAN), or else encapsulates the packet with a new (IPv6-in-IPv6) header in the event the receiver or next-hop is a new DODAG. In either of such scenarios, the concept is generally to move existing iOAM data from a previous header to new, "locally pertinent" header, and to append that new header with additional (e.g., new DODAG related or fog related) information. The fog router (in case of inter-domain traffic), the root node, or a last 6LR router along a transmission path (e.g., to the 6LR or to a 6LN), depending upon operational configuration, removes the in-situ OAM header information for use (e.g., sharing with remote OAM servers), or may leverage the data for IoT service assurance as described below.

Figure 7:
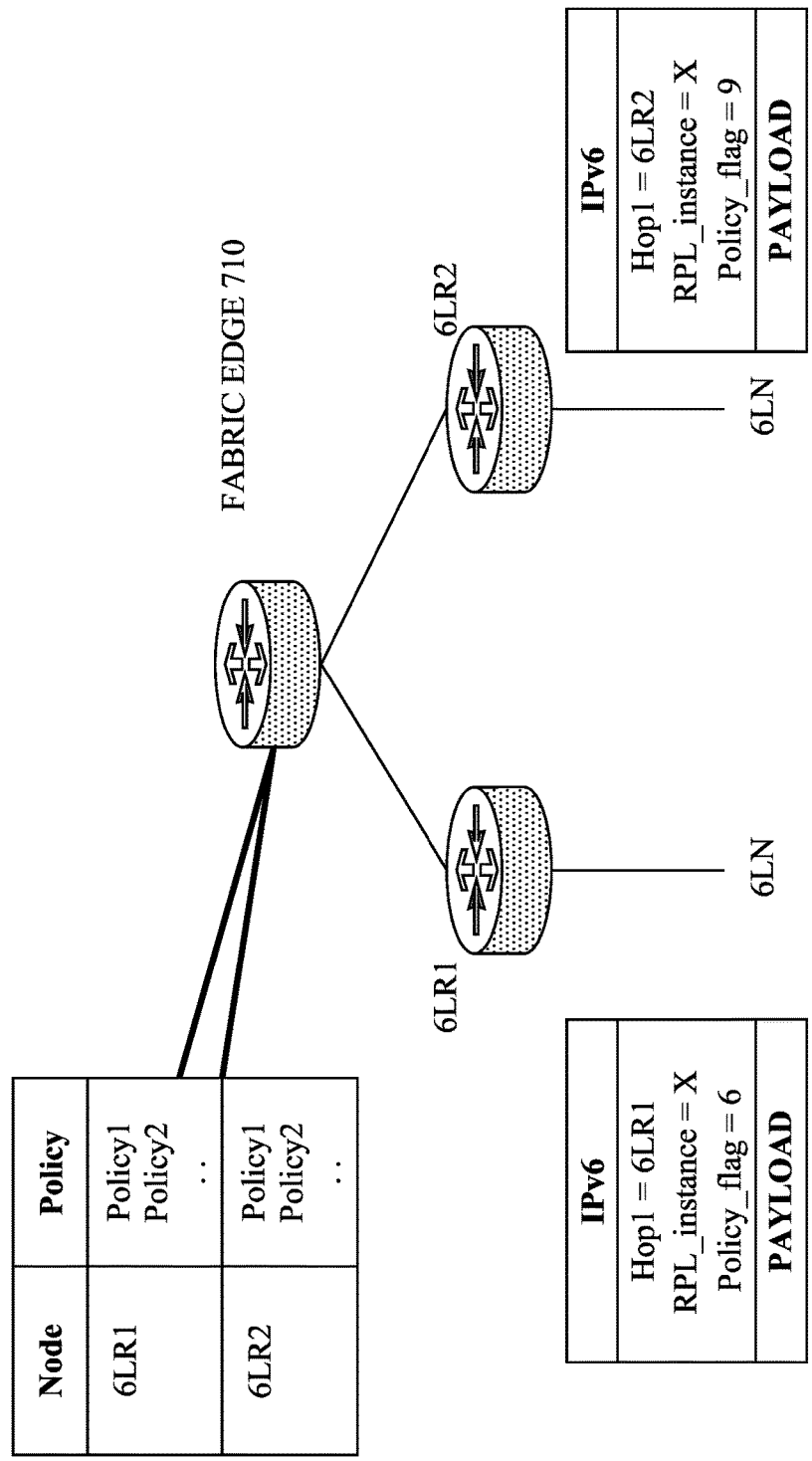
FIG. 7 illustrates an example of policy compliance in SDAs.

In particular, according to one or more particular embodiments herein, the techniques herein also provide a new "Proof of Policy" application, with reference generally to FIG. 7 (of a general SDA network 700, e.g., an underlay network, either IP, MPLS, Segment Routing (SR), SRv6, etc., as will be understood by those skilled in the art). While it is a recommended practice to apply policies as close as possible to the source, it might be challenging in a power constrained environment. According to the techniques herein, when policies are instantiated on a 6LR to be applied to set of 6LNs, it may be enabled/instructed to use the iOAM header to signal if the policies were actually applied for particular traffic.

Illustratively, each of the policies configured in a 6LR may be assigned a unique code, number, or share of the secret from a polynomial (e.g., following a proof of transit model as defined in the IETF Draft: draft-brockners-proof-of-transit, as will be appreciated by those skilled in the art). When the 6LR applies policies, it may selectively apply them based on load, function, capability, and so on (e.g., certain policies may only be relevant if leaving a DODAG, and can thus wait to be processed). As such, the 6LR may mark the iOAM field of the packet 610 with a "policy flag" that indicates which policies were applied. For example, when 6LR1 is loaded, it can ignore a certain policy application, and in which case, the policy flag will be different in the in-situ OAM header from another device, e.g., 6LR2, which applied all of the relevant policies. The Fog router or 6LBR (root), referred to in FIG. 7 simply as "fabric edge" 710, upon receiving a packet, will either simply forward the packet if the policies have all been applied (i.e., the policy flag matches an expected value), or else must act on the unapplied policies.

For example, based on the received policy flag value, the 6LBR or Fog router will be able to identify the policy or policies that were not applied and accordingly, 6LBR will apply the policy before forwarding the packet out. In other words, the techniques herein allow the 6LR to perform dataplane-based service assurance signaling to fabric edge router (Fog/root node) and let it act as a policy proxy, applying the policy conditionally as and when required.

As an example, a simplified algorithm may be based on a prime number range. For instance, the techniques herein may use a range of prime numbers (x0, x1, x2 . . . xn) where the addition of any combination will always result in a unique value:

$$x0!=(x0+x1)!=(x0+x1+x2)!=(x0+x2)\ldots$$

A few examples are {1,3}, {1,3,5}, {1,3,5,11}, {1,3,5,11, 23}, and so on.

Assume, for instance, that 6LR1 is configured with three policies and associated with the relevant prime number from the above range.

Policy1=1,
Policy2=3,
Policy3=5.

Each 6LR will simply add the applied policy values together (and optionally to any previously received value for previously performed policies), and creates a value (e.g., cumulative) that will be provided in the header. In the above example, Policy1 and Policy3 are applied by 6LR1, while Policy2 is not. This will create a value of 6. For this packet, since the fabric edge device (6LBR/Fog router) will be populated with the relevant policy and the associated values, it can use the value in the header to identify if all policies were applied and can then accordingly decide if a particular policy should be applied or not (e.g., Policy2).

Other policy flag embodiments may be used, and the above prime number algorithm is merely an example. For example, depending on the policy deployment model, the techniques herein can use a simple header (even a single bit for single policy applications). For example if the number of policies applied on different nodes are not large, the techniques herein could use a 4-byte value to carry the "Proof of Policy" (PoP) cumulative value (that is, $2^{32}$ is a reasonable size to cover many policies). If it is very large (in unlikely deployment scenarios), the techniques herein can segment the values on a per 6LR basis, i.e., the value will be unique to each 6LR. In this case, a 6LR identifier can be carried for identification purposes, thus 16 bytes (assuming that we reuse IPv6 address) plus a 4-byte PoP value.

Figure 8:
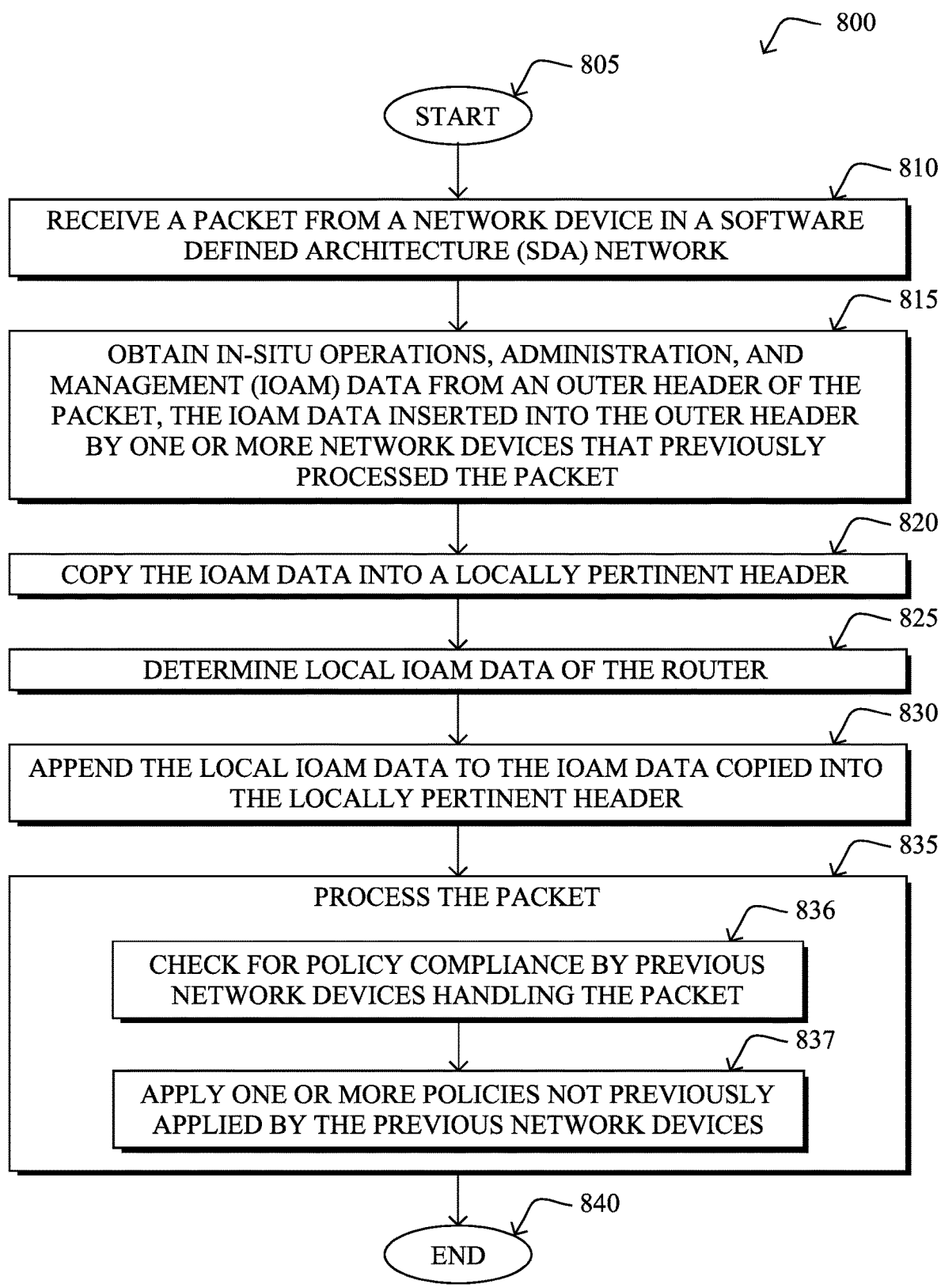
FIG. 8 illustrates an example simplified procedure for iOAM for SDAs.

FIG. 8 illustrates an example simplified procedure for in-situ Operations, Administration, and Maintenance (iOAM) for Software Defined Architectures (SDAs) in a network in accordance with one or more embodiments described herein. For example, a non-generic, specifically configured device (e.g., device 200, e.g., a router such as a root node of the SDA network or a fog node attached to the SDA network) may perform procedure 800 by executing stored instructions (e.g., process 248). The procedure 800 may start at step 805, and continues to step 810, where, as described in greater detail above, a packet is received at a router from a network device in an SDA network, such as from a 6LoWPAN device in a RPL network (e.g., 6LN, 6LR, etc.), a leaf node, a router, a root node of the SDA network, and so on. In step 815, iOAM data is then obtained from an outer header of the packet, the iOAM data inserted into the outer header by one or more network devices that previously processed the packet. As mentioned above, iOAM data may include such things as SDA network identifiers (IDs), network instance IDs, time received, timeslot info, node IDs, channel info, etc.

In step 820, the iOAM data is copied into a locally pertinent header (e.g., a new header or an inner header for encapsulated traffic, as described above). Then, in step 825, the router determines local iOAM data of the router, and appends the local iOAM data to the iOAM data copied into the locally pertinent header in step 830. The router may then process the packet, accordingly, in step 835 (e.g., routing the packet, using the iOAM data, etc.). In particular, as shown in sub-steps 836 and 837, the router may check for policy compliance by previous network devices handling the packet, and apply one or more policies not previously applied by the previous network devices, as described above (e.g., based on compressed policy data, such as a prime number additive algorithm, a polynomial computation algorithm, and so on, mentioned above and otherwise). The illustrative procedure 800 may then end in step 840.

Figure 9:
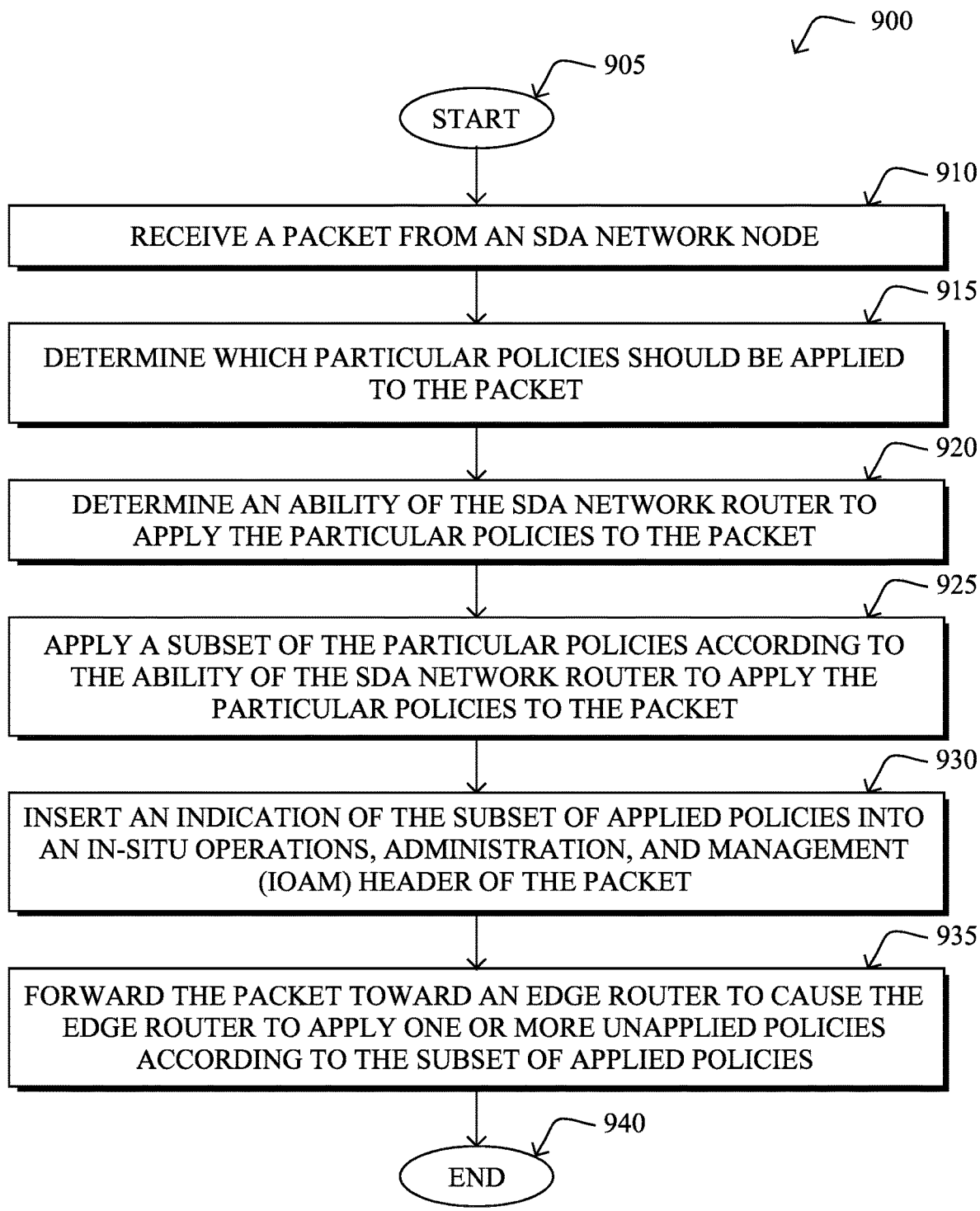
FIG. 9 illustrates an example simplified procedure for policy compliance in SDAs.

Additionally, FIG. 9 illustrates another example simplified procedure for in-situ Operations, Administration, and Maintenance (iOAM) for Software Defined Architectures (SDAs) in a network in accordance with one or more embodiments described herein, particularly a procedure for policy compliance in SDAs. For example, a non-generic, specifically configured device (e.g., device 200, e.g., an SDA network router such as a 6LR) may perform procedure 900 by executing stored instructions (e.g., process 249 and/or 248). The procedure 900 may start at step 905, and continues to step 910, where, as described in greater detail above, the router receives a packet from an SDA network node (e.g., 6LN), and determines, in step 915, which particular policies should be applied to the packet. As described above, the SDA network router may determine its ability to apply the particular policies to the packet in step 920 (e.g., based on load of the SDA network router), and then in step 925 may apply a subset of the particular policies according to the ability of the SDA network router to apply the particular policies to the packet. As such, in step 930, the SDA network router inserts an indication of the subset of applied policies (or indication of the unapplied policies) into an iOAM header of the packet, and forwards the packet in step 935 toward an edge router (e.g., a root node of the SDA network or a fog router attached to the SDA network) to cause the edge router to apply one or more unapplied policies according to the subset of applied policies. As detailed above, the indication may be based on compressed policy data, such as a prime number additive algorithm, a polynomial computation algorithm, and so on. The illustrative procedure 900 may then end in step 940.

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The techniques described herein, therefore, provide for in-situ Operations, Administration, and Maintenance (iOAM) for Software Defined Architectures (SDAs) (e.g., RPL instances). In particular, the techniques herein provide for in-situ OAM for end-to-end SDA-based path record and policy service assurance (SA) for a RPL-based IoT network (that is, the techniques herein will be able to identify if the service (policy in this case) is applied and if not, ensures that the relevant policy is applied before forwarding). Notably, other techniques, such as SRv6 Segment Routing Headers for IoT, may help to perform basic path information that can used for loop avoidance, but these known techniques are insufficient to cover all of the challenges mentioned above.

While there have been shown and described illustrative embodiments that provide for in-situ Operations, Administration, and Maintenance (iOAM) for Software Defined Architectures (SDAs), it is to be understood that various other adaptations and modifications may be made within the spirit and scope of the embodiments herein. For example, while certain embodiments are described herein with respect to using certain protocols, such as RPL, 6LoWPAN, iOAM, etc., the techniques herein are not limited as such, and may be used with functionally equivalent protocols, in other embodiments. In addition, while certain types of nodes or devices have been mentioned in the examples above, the procedures herein may be applied on different nodes or devices within the computer networks (e.g., remote servers, cloud devices, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, at a router, a packet from a network device in a software defined architecture (SDA) network;
    obtaining, by the router, in-situ operations, administration, and management (iOAM) data from an outer header of the packet, the iOAM data inserted into the outer header by one or more network devices that previously processed the packet;
    copying, by the router, the iOAM data into a locally pertinent header;
    determining, by the router, local iOAM data of the router;
    appending, by the router, the local iOAM data to the iOAM data copied into the locally pertinent header; and
    processing, by the router, the packet wherein processing comprises:
        checking, based on compressed policy data, for policy compliance by previous network devices handling the packet.

2. The method as in claim 1, wherein the router is one of either a root node of the SDA network or a fog node attached to the SDA network.

3. The method as in claim 1, wherein the network device is selected from a group consisting of: an (IPv6 over Low-Power Wireless Personal Area Networks (6LoWPAN) device in an IPv6 Routing Protocol for Low Power and Lossy Networks (RPL) network; a leaf node; a router; and a root node of the SDA network.

4. The method as in claim 1, wherein the locally pertinent header is one of either a new header, or an inner header for encapsulated traffic.

5. The method as in claim 1, wherein processing the packet comprises:
    routing the packet.

6. The method as in claim 1, wherein processing the packet comprises:
    using the iOAM data.

7. The method as in claim 1, further comprising:
    applying one or more policies not previously applied by the previous network devices.

8. The method as in claim 1, wherein compressed policy data comprises a prime number additive algorithm.

9. The method as in claim 1, wherein compressed policy data comprises a polynomial computation algorithm.

10. The method as in claim 1, wherein iOAM data is selected from a group consisting of: SDA network identifiers (IDs); network instance IDs; time received; timeslot info; node IDs; and channel info.

11. A method, comprising:
    receiving, at a software defined architecture (SDA) network router, a packet from an SDA network node;
    determining, by the SDA network router, which particular policies should be applied to the packet;
    determining, by the SDA network router, an ability of the SDA network router to apply the particular policies to the packet;
    applying, by the SDA network router, a subset of the particular policies according to the ability of the SDA network router to apply the particular policies to the packet;
    inserting, by the SDA network router, an indication of the subset of applied policies into an in-situ operations, administration, and management (iOAM) header of the packet, wherein the indication is based on compressed policy data; and
    forwarding, by the SDA network router, the packet toward an edge router to cause the edge router to apply one or more unapplied policies according to the subset of applied policies.

12. The method as in claim 11, wherein determining the ability of the SDA network router to apply the particular policies to the packet is based on load of the SDA network router.

13. The method as in claim 11, wherein the edge router is one of either a root node of the SDA network or a fog router attached to the SDA network.

14. The method as in claim 11, wherein compressed policy data comprises a prime number additive algorithm.

15. The method as in claim 11, wherein compressed policy data comprises a polynomial computation algorithm.

16. An apparatus, comprising:
    one or more network interfaces to communicate within a software defined architecture (SDA) network;
    a processor coupled to the one or more network interfaces and configured to execute one or more processes; and
    a memory configured to store a process executable by the processor, the process when executed operable to:
        receive a packet from a network device in the SDA network;
        obtain in-situ operations, administration, and management (iOAM) data from an outer header of the packet, the iOAM data inserted into the outer header by one or more network devices that previously processed the packet;
        copy the iOAM data into a locally pertinent header;
        determine local iOAM data of the apparatus;
        append the local iOAM data to the iOAM data copied into the locally pertinent header; and
        process the packet, wherein processing comprises:
            checking, based on compressed policy data, for policy compliance by previous network devices handling the packet.

17. The apparatus as in claim 16, wherein the process, when configured to process the packet, is further configured to:
    apply one or more policies not previously applied by the previous network devices.

18. The apparatus as in claim 16, wherein compressed policy data comprises a prime number additive algorithm.

19. The apparatus as in claim 16, wherein compressed policy data comprises a polynomial computation algorithm.

20. The apparatus as in claim 16, wherein the process, when configured to process the packet, is further configured to:
  use the iOAM data.

\* \* \* \* \*